(12) United States Patent
Cheng et al.

(10) Patent No.: US 7,130,491 B2
(45) Date of Patent: Oct. 31, 2006

(54) SYSTEM AND METHOD FOR INTERPOLATING A COLOR IMAGE

(75) Inventors: Christopher J. Cheng, Belmont, MA (US); Robert A. Ulichney, Stow, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 789 days.

(21) Appl. No.: 10/389,517

(22) Filed: Mar. 14, 2003

(65) Prior Publication Data

US 2004/0179752 A1    Sep. 16, 2004

(51) Int. Cl.
    *G06K 9/32*    (2006.01)
(52) U.S. Cl. .................. 382/300; 708/290; 348/273
(58) Field of Classification Search ................ 382/300, 382/162, 167; 348/207, 222, 231, 232, 272, 348/273, 266, 280, 281, 282; 358/518–521; 708/290
    See application file for complete search history.

(56) References Cited

U.S. PATENT DOCUMENTS

| | | | | |
|---|---|---|---|---|
| 5,382,976 A | * | 1/1995 | Hibbard | 348/273 |
| 6,421,084 B1 | * | 7/2002 | Chang et al. | 348/273 |
| 6,983,298 B1 | * | 1/2006 | Thakur | 708/290 |

* cited by examiner

*Primary Examiner*—Yon J. Couso

(57) ABSTRACT

A system and method interpolates a full color image from an array of single color sensors. Each sensor measures a single color, e.g., red, green or blue. The measured color values are stored as an array of data. For each data element, a plurality, e.g., four, gradients are computed that specify the color and/or luminance difference along different linear paths extending through the data element. At least some of the gradients are computed using a first order color differential and a second order color or luminance differential along the selected path. One or more gradients are then selected based on a comparison of the gradients to a computed threshold. Using the data elements along the path of the selected gradient or gradients, the missing color values are interpolated. The interpolation algorithm also utilizes first and second order color differentials.

10 Claims, 10 Drawing Sheets

```
gsum=0; cnt=0  ~402
if (NESW > Threshold && NWSE > Threshold)  ~404
        if (NS <= Threshold)  ~406
                gsum += (g4+g9) / 2 + ((r5-r8) – (r2-r5)) / 4;  ~408
                cnt++;  ~410
        end if
        if (EW <= Threshold)  ~412
                gsum += (g6+g7) / 2 + ((r5-r6) - (r4-r5)) / 4;  ~416
                cnt++;  ~418
        end if
else
        if (NESW <= Threshold)  ~420
                gsum += (g4+g9) / 2 + ((r5-r8) – (r2-r5)) / 4 + (g6+g7) / 2 + ((r5-r6) – (r4-r5)) / 4;  ~422
                cnt += 2;  ~424
                t_gsum = 0; t_cnt = 0;  ~426
                if (NS <= Threshold)  ~428
                        t_gsum += (g2+g11) / 2 + (((r5-r7) - (r3-r5)) + ((r5-r8) – (r2-r5))) / 4;  ~430
                        t_cnt++;  ~432
                end if
                if (EW <= Threshold)  ~434
                        t_gsum += (g5+g8) / 2 + (((r5-r7) – (r3-r5)) + ((r5-r6) – (r4-r5)) / 4;  ~436
                        t_cnt++;  ~438
                end if
                if (t_cnt > 0)  ~440
                        gsum += t_gsum/t_cnt;  ~442
                        cnt ++;  ~444
                end if
        end if
        if (NWSE <= Threshold)  ~446
                gsum += (g4+g9) / 2 + ((r5-r8) – (r2-r5)) / 4 + (g6+g7) / 2 + ((r5-r6) – (r4-r5)) / 4;  ~448
                cnt += 2;  ~450
                t_gsum = 0; t_cnt = 0;  ~452
                if (NS <= Threshold)  ~454
                        t_gsum += (g1+g12) / 2 + (((r5-r9) – (r1-r5)) + ((r5-r8) – (r2-r5))) / 4;  ~456
                        t_cnt++;  ~458
                end if
                if (EW <= Threshold)  ~460
                        t_gsum += (g3+g10) / 2 + (((r5-r9) – (r1-r5)) + ((r5-r6) – (r4-r5))) / 4;  ~462
                        t_cnt++;  ~464
                end if
                if (t_cnt > 0)  ~466
                        gsum += t_gsum/t_cnt;  ~468
                        cnt ++;  ~470
                end if
        end if
end if
g = gsum / cnt;  ~414
```

FIG. 4

```
gsum=0; cnt=0   ~ 602
if (NESW > Threshold && NWSE > Threshold)   ~ 604
        if (NS <= Threshold)   ~ 606
                gsum += (g4+g9) / 2 + ((b5-b8) – (b2-b5)) / 4;   ~ 608
                cnt++;   ~ 610
        end if
        if (EW <= Threshold)   ~ 612
                gsum += (g6+g7) / 2 + ((b5-b6) - (b4-b5)) / 4;   ~ 616
                cnt++;   ~ 618
        end if
else
        if (NESW <= Threshold)   ~ 620
                gsum += (g4+g9) / 2 + ((b5-b8) – (b2-b5)) / 4 + (g6+g7) / 2 + ((b5-b6) – (b4-b5)) / 4;   ~ 622
                cnt += 2;   ~ 624
                t_gsum = 0; t_cnt = 0;   ~ 626
                if (NS <= Threshold)   ~ 628
                        t_gsum += (g2+g11) / 2 + (((b5-b7) - (b3-b5)) + ((b5-b8) – (b2-b5))) / 4;   ~ 630
                        t_cnt++;   ~ 632
                end if
                if (EW <= Threshold)   ~ 634
                        t_gsum += (g5+g8) / 2 + (((b5-b7) – (b3-b5)) + ((b5-b6) – (b4-b5))) / 4;   ~ 636
                        t_cnt++;   ~ 638
                end if
                if (t_cnt > 0)   ~ 640
                        gsum += t_gsum/t_cnt;   ~ 642
                        cnt ++;   ~ 644
                end if
        end if
        if (NWSE <= Threshold)   ~ 646
                gsum += (g4+g9) / 2 + ((b5-b8) – (b2-b5)) / 4 + (g6+g7) / 2 + ((b5-b6) – (b4-b5)) / 4;   ~ 648
                cnt += 2;   ~ 650
                t_gsum = 0; t_cnt = 0;   ~ 652
                if (NS <= Threshold)   ~ 654
                        t_gsum += (g1+g12) / 2 + (((b5-b9) – (b1-b5)) + ((b5-b8) – (b2-b5))) / 4;   ~ 656
                        t_cnt++;   ~ 658
                end if
                if (EW <= Threshold)   ~ 660
                        t_gsum += (g3+g10) / 2 + (((b5-b9) – (b1-b5)) + ((b5-b6) – (b4-b5))) / 4;   ~ 662
                        t_cnt++;   ~ 664
                end if
                if (t_cnt > 0)   ~ 666
                        gsum += t_gsum/t_cnt;   ~ 668
                        cnt ++;   ~ 670
                end if
        end if
end if
g = gsum / cnt;   ~ 614
```

```
rsum = 0; cnt = 0;  ~ 902
if (NS <= threshold)  ~ 904
        if (EW < NS)  ~ 906
                rsum += (r1 + r4 + r3 + r6) + ((g7-g:r3) - (g:r1-g7)) / 2 +
                                              ((g7-g:r6) - (g:r4-g7)) / 2;  ~ 908
                cnt += 4;  ~ 910
        else if (NS < EW)  ~ 918
                rsum += (r2 + r5) * 2 + ((g7-g:r2) - (g:r5-g7));  ~ 920
                cnt += 4;  ~ 922
        else
                rsum += (r1 + r4 + r3 + r6) + ((g7-g:r3) - (g:r1-g7)) / 2 +
                                              ((g7-g:r6) - (g:r4-g7)) / 2;  ~ 924
                rsum += (r2 + r5) * 2 + ((g7-g:r2) - (g:r5-g7));  ~ 926
                cnt += 8;  ~ 928
        end if
else if (EW <= threshold)  ~ 930
        rsum += (r1 + r4 + r3 + r6) + ((g7-g:r3) - (g:r1-g7)) / 2 +
                                      ((g7-g:r6) - (g:r4-g7)) / 2;  ~ 932
        cnt += 4;  ~ 934
end if
if (NESW <= threshold)  ~ 912
        if (NWSE < NESW)  ~ 936
                rsum += (r1 + r2 + r6 + r5) + ((g7-g:r1) - (g:r6-g7)) + ((g7-g:r2) - (g:r5-g7));  ~ 938
                cnt += 4;  ~ 940
        else if (NESW < NWSE) {  ~ 942
                rsum += (r3 + r2 + r4 + r5) + ((g7-g:r3) - (g:r4-g7)) + ((g7-g:r2) - (g:r5-g7));  ~ 944
                cnt += 4;  ~ 946
        else
                rsum += (r1 + r2 + r6 + r5) + ((g7-g:r1) - (g:r6-g7)) + ((g7-g:r2) - (g:r5-g7));  ~ 948
                rsum += (r3 + r2 + r4 + r5) + ((g7-g:r3) - (g:r4-g7)) + ((g7-g:r2) - (g:r5-g7));  ~ 950
                cnt += 8;  ~ 952
        end if
else if (NWSE <= threshold)  ~ 914
        rsum += (r1 + r2 + r6 + r5) + ((g7-g:r1) - (g:r6-g7)) + ((g7-g:r2) - (g:r5-g7));  ~ 954
        cnt += 4;  ~ 956
end if
r = rsum / cnt;  ~ 916
```

FIG. 9

```
rsum = 0; cnt = 0;  ~1002
if (NS <= threshold)  ~1004
        if (EW < NS)  ~1006
                rsum += (r1 + r2 + r5 + r6) + ((g7-g:r5) - (g:r1-g7)) / 2 +
                                              ((g7-g:r6) - (g:r2-g7)) / 2;  ~1008
                cnt += 4;  ~1010
        else if (NS < EW)  ~1018
                rsum += (r3 +r4) * 2 + ((g7-g:r3)- (g:r4-g7));  ~1020
                cnt += 4;  ~1022
        else
                rsum += (r1 + r2 + r5 + r6) + ((g7-g:r5) - (g:r1-g7)) / 2 +
                                              ((g7-g:r6) - (g:r2-g7)) / 2;  ~1024
                rsum += (r3 +r4) * 2 + ((g7-g:r3)- (g:r4-g7));  ~1026
                cnt += 8;  ~1028
        end if
else if (EW <= threshold)  ~1030
        rsum += (r1 + r2 + r5 + r6) + ((g7-g:r5) - (g:r1-g7)) / 2 +
                                      ((g7-g:r6) - (g:r2-g7)) / 2;  ~1032
        cnt += 4;  ~1034
end if
if (NESW <=threshold)  ~1012
        if (NWSE < NESW)  ~1036
                rsum += (r2 + r4 + r3 + r5) + ((g7-g:r2) – (g:r3-g7)) + ((g7-g:r4) – (g:r5-g7));  ~1038
                cnt += 4;  ~1040
        else if (NESW < NWSE) {  ~1042
                rsum += (r1 + r3 + r4 + r6) + ((g7-g:r1) – (g:r4-g7)) + ((g7-g:r2) – (g:r6-g7));  ~1044
                cnt += 4;  ~1046
        else
                rsum += (r2 + r4 + r3 + r5) + ((g7-g:r2) – (g:r3-g7)) + ((g7-g:r4) – (g:r5-g7));  ~1048
                rsum += (r1 + r3 + r4 + r6) + ((g7-g:r1) – (g:r4-g7)) + ((g7-g:r2) – (g:r6-g7));  ~1050
                cnt += 8;  ~1052
        end if
else if (NWSE <= threshold)  ~1014
        rsum += (r2 + r4 + r3 + r5) + ((g7-g:r2) – (g:r3-g7)) + ((g7-g:r4) – (g:r5-g7));  ~1054
        cnt += 4;  ~1056
end if
r = rsum / cnt;  ~1016
```

FIG. 10

```
rsum = 0; cnt = 0;  ~ 1102
if (NS <= threshold || EW <= threshold) ~1104
        rsum += (r1 + r2 + r3 + r4) + ((g:b5-g:r3) - (g:r2-g:b5)) / 2 +
                                      ((g:b5-g:r1) - (g:r4-g:b5)) / 2;  ~1106
        cnt += 4;  ~1108
else
        if (NESW <= threshold) ~1112
                rsum += (r2 + r3) + ((g:b5-g:r3) - (g:r2-g:b5));  ~1114
                cnt += 2;  ~1116
        end if
        if (NWSE <= threshold) ~1118
                rsum += (r1 + r4) + ((g:b5-g:r1) - (g:r4-g:b5));  ~1120
                cnt += 2;  ~1122
        end if
end if
r = rsum / cnt;  ~1110
```

SYSTEM AND METHOD FOR INTERPOLATING A COLOR IMAGE

BACKGROUND OF THE INVENTION

1. Field of the Invention

The invention relates to digital imaging and, more specifically, to interpolating a color image using multiple gradients.

2. Background Information

In digital color imaging, an image plane having a rectangular array of sensor elements is typically used to measure varying intensities of electromagnetic radiation, such as visible light. For color imaging, it is desirable to capture image data in three color planes, typically red, green and blue (RGB). When the three color planes are combined, it is possible to create high-quality color images. Capturing three color planes is typically accomplished by placing a color filter array (CFA) between the lens and the sensors of the array. For each sensor of the array, the CFA filters all but one of the color planes. Thus, each sensor measures one of red, green, or blue intensity.

One of the most common CFA arrangements or patterns is described in U.S. Pat. No. 3,971,065 to Bayer, and is known as a Bayer array or pattern. The Bayer array is a four-by-four, repeating pattern of color filters as shown below.

G R G R
B G B G
G R G R
B G B G

Several methods have been developed for interpolating the "missing" color elements for each sensor, e.g., the red and blue values at a "green" element, the blue and green values at a "red" element, etc. These methods, however, are either too expensive computationally or produce undesirable artifacts in the resulting image. Thus, a need exists for a method for accurately and efficiently generating missing color values in a digital image sensing system.

SUMMARY OF THE INVENTION

Briefly, the invention relates to a system and method for interpolating a full color image from an array of single color sensors. Each sensor measures a single color, e.g., red, green or blue. The measured color values are stored as an array of data. For each data element, a plurality, e.g., four, gradients are computed that specify the color and/or luminance difference along different linear paths extending through the data element. At least some of the gradients are computed using a first order color differential and a second order color or luminance differential along the selected path. One or more gradients are then selected based on a comparison of the gradients to a threshold. Using the data elements along the path of the selected gradient or gradients, the missing color values are interpolated. The interpolation algorithm also utilizes first and second order color differentials.

BRIEF DESCRIPTION OF THE DRAWINGS

The invention description below refers to the accompanying drawings, of which:

FIGS. 4, 6 and 9–11 are representations of pseudo-code that describe a preferred operation of the present invention.

DETAILED DESCRIPTION OF AN ILLUSTRATIVE EMBODIMENT

Figure 1:
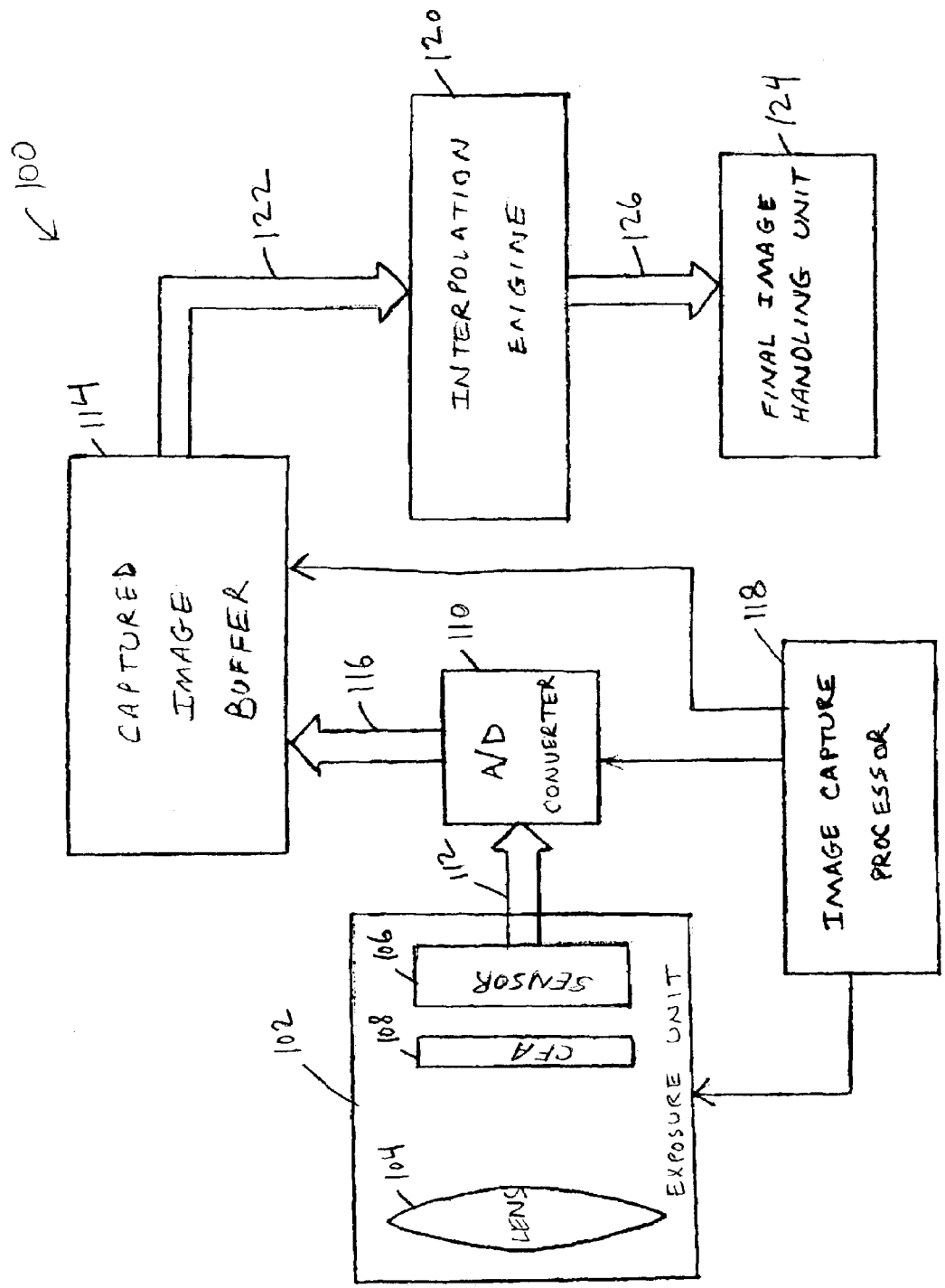
FIG. 1 is a highly schematic illustration of a digital camera configured in accordance with the present invention.

FIG. 1 is a highly schematic, functional diagram of a digital camera 100 in accordance with the present invention. The camera 100 has an exposure unit 102 having a lens 104 and an image sensor 106. The lens 104 is configured to direct electromagnetic radiation, such as visible light, received by the exposure unit 102 to the image sensor 106. The image sensor 106 is preferably formed from a two-dimensional array of sensors, such as photosites, where each sensor corresponds to a picture element or pixel. Suitable charge coupled devices (CCDs) may be used to fabricate the sensor 106. Disposed on or at the image sensor 106 is a color filter array (CFA) 108. For each pixel, the CFA 108 filters the visible light corresponding to all but one color, e.g., red, green or blue. The CFA 108 preferably has a Bayer geometry or pattern as described in U.S. Pat. No. 3,971,065, which is hereby incorporated by reference in its entirety. That is, the CFA 108 has the following repeating pattern.

G R G R
B G B G
G R G R
B G B G

The charge information detected by the image sensor 106 is converted to analog information and passed to an analog/digital (A/D) converter 110, as indicated by arrow 112. The A/D converter 110 translates the analog information into a captured digital signal which is provided to a captured image buffer 114 for storage, as indicated by arrow 116. Camera 100 further includes an image capture processor 118 that is operably coupled to the exposure unit 102, the A/D converter 110 and the captured image buffer 114. The image capture processor 118 operates the exposure unit 102 by driving the image sensor 112, among other components, such as a shutter, diaphragm, etc., to capture a desired image or picture. The image processor 118 also operates the A/D converter 110 so as to produce the digital signal, and the capture image buffer 114 so as to store the digital signal or data.

Camera 100 further includes an interpolation engine 120 that receives digital data from the captured image buffer 114, as indicated by arrow 122, and interpolates the missing red, green and blue color values for the respective pixels to produce a final color image for each captured image. The interpolation engine 120 then hands the final image to a final image handling unit 124, as indicated by arrow 126. Those skilled in the art will recognize that the final image handling unit 124 may be a memory and/or a data transfer mechanism, such as a Universal Serial Bus (USB) port and corresponding circuitry for transferring the final image from the camera 100 to some other device, such as personal computer (PC) or a printer.

It will be understood by those skilled in the art that the interpolation engine 120 may comprise registers and combinational logic configured and arranged to produce sequential logic circuits. In the illustrated embodiment, engine 120 is preferably one or ore software modules or libraries containing program instructions pertaining to the methods described herein, and executable by one or more processing elements, such as processor 118 or other, perhaps dedicated processors (not shown) of camera 100. Other computer readable media may also be used to store and execute these program instructions. Nonetheless, those skilled in the art will recognize that various combinations of software and hardware, including firmware, may be utilized to implement the present invention.

Suitable digital cameras for use with the present invention include the Canon PowerShot S30 from Canon U.S.A., Inc. of Lake Success, N.Y., and the Olympus Camedia series of digital cameras from Olympus America, Inc. of Melville, N.Y., among others. Nonetheless, it should be understood that the present invention may also be used with digital video cameras and other imaging devices, such as night-vision equipment, etc.

Figure 2:
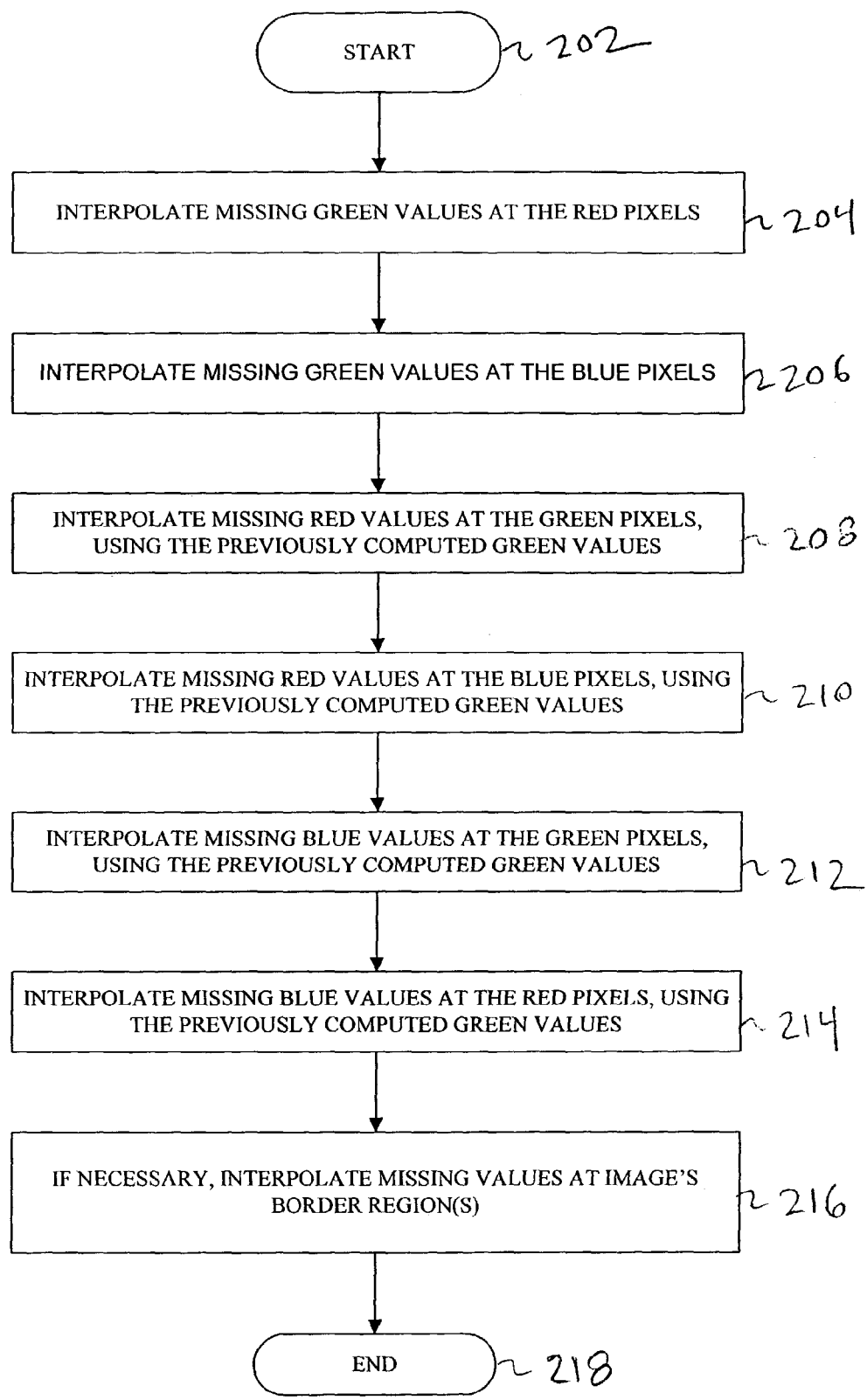
FIG. 2 is a high-level flow diagram of a preferred embodiment of the method of the present invention.

FIG. 2 is a high-level flow diagram of the steps performed by the interpolation engine 120 in computing missing color values. The interpolation process of the present invention begins at start box 202. For a given captured image, the interpolation engine 120 first computes the missing green color values for each of the red and blue pixels, as indicated at blocks 204 and 206. Next, engine 120 computes the missing red color values at the green pixels, as indicated at block 208. Engine 120 then computes the missing red color values for the blue pixels, as indicated at block 210. Engine 120 goes on to compute the missing blue color values for the green pixels, as indicated at block 212. Finally, engine 120 computes the missing blue color values at the red pixels, as indicated at block 214.

As described herein, the present invention utilizes the values of surrounding pixels to compute or interpolate the missing values of the current pixel. If one or more boundaries of the final image are at or near the boundaries of the data from the respective capture image, there may be insufficient surrounding pixel values to utilize the present invention. In this case, the interpolation engine 120 preferably utilizes another technique or method to compute missing color values, as indicated at block 216. The process is then complete as indicated by end block 218

Interpolation of Missing Green Values

Figure 3:
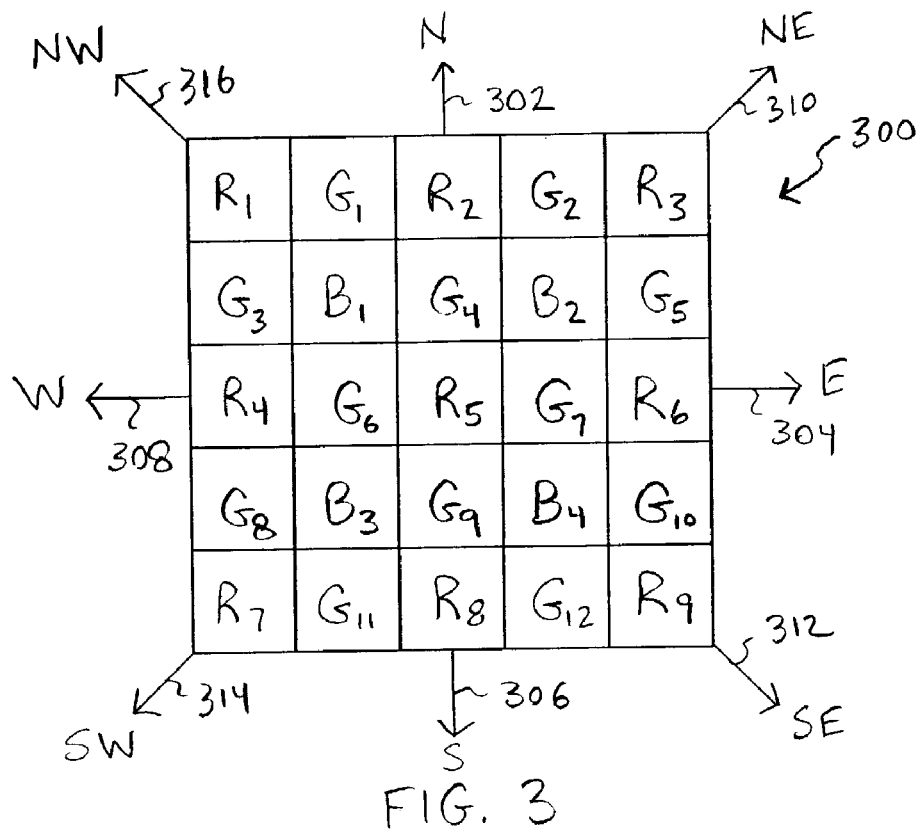
FIGS. 3, 5 and 7–8 are highly schematic illustrations of data arrays as utilized in the present invention.

As indicated above, the interpolation engine 120 first computes the missing green color values at those pixels configured to measure red and blue color values. To compute the missing green value for a red pixel, the interpolation engine 120 preferably considers the values of a five-by-five grid of pixels having the subject red pixel located at the grid's center. FIG. 3 is a highly schematic, top view of a five-by-five array or grid of color data 300 as measured by sensor 106. As shown, the array 300 includes nine red pixels labeled $R_1$ through $R_9$, twelve green pixels labeled $G_1$ through $G_{12}$, and four blue pixels labeled $B_1$ through $B_4$. At the center of the grid 300 is red pixel, $R_5$, which corresponds to the subject red pixel, for which a missing green value is to be computed. The pattern illustrated by array 300 conforms to the Bayer CFA pattern as described in U.S. Pat. No. 3,971,065.

Compute Missing Green Values at Red Pixels

To compute a green color value for a red pixel as represented by block 204 (FIG. 2), the interpolation engine 120 (FIG. 1) first computes four gradients relative to the red pixel for which the missing green color value is being computed. Each gradient is computed by considering the sum of the absolute value of the color differences along the respective gradient (for the missing color being computed) and the absolute value of Laplacian second-order color terms. The gradients may be viewed in terms of compass directions relative to the subject pixel. Referring to the grid 300 of FIG. 3, there is a North (N) direction 302 that extends above the subject red pixel, an East (E) direction 304 that extends to the right of the red pixel, a South (S) direction 306 that extends below the red pixel and a West (W) direction 308 that extends to the left of the red pixel, as indicated by arrows 302–308, respectively. Given these four compass directions, there are also four diagonals directions, including a North-East direction 310, a South-East direction 312, a South-West direction 314, and a North-West direction 316. In accordance with the present invention, gradients are computed along four directions relative to the subject pixel: North-South (N-S), East-West (E-W), NorthEast-SouthWest (NE-SW), and NorthWest-SouthEast (NW-SE).

In the illustrative embodiment, the algorithm for computing each gradient includes a first order color difference term whose elements preferably correspond to the color value being determined, in this case green, and a second order Laplacian term. It is preferable to use green values when calculating the second order Laplacian term, as green is most closely correlated with luminance. However, green values cannot be used in the second order Laplacian term when it is the green values that are being computed, because there are not enough green values along the directions for which gradients are being computed. Accordingly, in this case either red or blue values are preferably used in the second order Laplacian term when computing the gradients for missing green values. In the preferred embodiment, when solving for a missing green value at a red pixel, the second order Laplacian term utilizes red values, because red pixels are located along the directions for which gradients are being computed.

The N-S gradient is computed by taking the difference between the green pixel values in the N-S direction and adding a second-order corrective term that increases the gradient if the rate of change of the gradient is increasing in the N-S direction. A suitable equation for computing the N-S gradient is as follows:

$$N\text{-}S=|G_4-G_9|+|(R_5-R_8)-(R_2-R_5)| \quad (1)$$

where $G_4$ represents the green color value measured by the sensor 106 at location $G_4$ of array 300 (FIG. 3), $G_9$ represents the green color value measured by the sensor 106 at location $G_6$, $R_5$ represents the red color value measured by the sensor 106 at location $R_5$, and so on. The E-W gradient is computed by taking the difference of the green pixel values along the E-W direction and adding a second-order corrective term that increases the gradient if the rate of change of the gradient is increasing in the E-W direction. A suitable equation for computing the E-W gradient is as follows:

$$E\text{-}W=|G_6-G_7|+|(R_5-R_4)-(R_6-R_5)| \quad (2)$$

The diagonal gradients are more difficult to compute as there is no measured green pixel information lying directly along the diagonals as there was when computing the vertical and horizontal gradients. Accordingly, the first term basically takes the difference between averaged green values lying roughly along the NE-SW direction and adding to it a second order term that again increases the gradient if the rate of change of the gradient in the NE-SW direction is increasing.

A suitable equation for computing the NE-SW gradient is computed as follows:

$$NE - SW = \left| \frac{(G_2 + G_5) - (G_6 + G_9)}{4} \right| + \qquad (3)$$
$$\left| \frac{(G_4 + G_7) - (G_8 + G_{11})}{4} \right| + \left| ((R_5 - R_7) - (R_3 - R_5)) + \right.$$
$$\left. \frac{((R_5 - R_8) - (R_2 - R_5))}{2} + \frac{((R_5 - R_4) - (R_6 - R_5))}{2} \right|$$

The differences of the green color values along the NE-SW direction are preferably divided by four in order to normalize the entire quantity to a single value. The latter two red color differences of equation (3) are divided by two in order to reduce the weight given to those color differentials as they do not lie directly on the NE-SW gradient.

As with the NE-SW gradient, the NW-SE gradient is computed by taking the difference of the averaged green values lying roughly in the NW-SE direction and adding to this difference a second order term that increases the gradient if the rate of change of the gradient in the NW-SE direction is increasing. A suitable equation for computing the NW-SE gradient is as follows:

$$NW - SE = \left| \frac{(G_1 + G_3) - (G_7 + G_9)}{4} \right| + \qquad (4)$$
$$\left| \frac{(G_4 + G_6) - (G_{10} + G_{12})}{4} \right| + \left| ((R_5 - R_9) - (R_1 - R_5)) + \right.$$
$$\left. \frac{((R_5 - R_8) - (R_2 - R_5))}{2} + \frac{((R_5 - R_4) - (R_2 - R_5))}{2} \right|$$

Rather than lying at an end of the gradients being computed, the subject pixel, e.g., $R_5$, is preferably located at or proximate to the middle of the gradient. For example, in computing the N-S gradient, both the first order color difference term and the second order Laplacian term use information from above and below the subject pixel. Similarly, in computing the E-W gradient, the first order color difference term and the second order Laplacian term use information from both the right and left of the subject pixel. The gradients thus extend through the subject pixel.

After the four gradients have been computed, engine 120 next determines a threshold for use in evaluating the computed gradients. In the preferred embodiment, in which RGB values range from 0 to 255, the threshold is computed as follows.

Threshold=MAX(α*MIN(Gradients), β), where α and β are variables. That is, the threshold is the greater of the variable α times the smallest computed gradient value or β. Through empirical study, suitable values for α and β are:

α=2.0 and β=25.

Provided that α is always equal to or above 1.0, then the threshold will always be at least the smallest gradient. In other words, at least one of the gradients will always be equal to or less than the computed gradient.

Nonetheless, those skilled in the art will recognize that other values may be used and that other algorithms may be utilized to determine the threshold.

After computing the four gradients and determining the threshold, engine 120 is ready to compute the missing green value. Basically, engine 120 checks to see whether either of the diagonal gradients, i.e., NE-SW or NW-SE, fall below the threshold. If neither of the diagonal gradients fall below the threshold, engine 120 checks to see whether the vertical or horizontal gradients fall below the threshold. If the vertical gradient falls below the threshold, the engine interpolates the missing green value using measured green values lying along the vertical axis in the first order color difference term and measured red values lying along the vertical axis in the second order Laplacian term. Similarly, if the horizontal gradient falls below the threshold, engine 120 interpolates the missing green value using measured green values lying along the horizontal axis in the first order color difference term and measured red values lying along the horizontal axis in the second order Laplacian term. If, however, either of the diagonals fall below the threshold, then the engine 120 interpolates along that diagonal. Interpolating along a diagonal is preferably performed in two steps.

First, engine 120 interpolates along both the horizontal and vertical axis using the four green pixels that surround the subject red pixel as these four green pixels also fall along both of the diagonals. Second, engine 120 considers the influence of the horizontal and vertical gradients on the diagonal gradient that fell below the threshold. In particular, if the vertical gradient also falls below the threshold, then the green pixels that are proximate to the vertical axis, i.e., $G_1$ and $G_{12}$ for the NW-SE gradient and $G_2$ and $G_{11}$ for the NE-SW gradient, are included in the interpolation together with one-half of the diagonal and vertical second-order Laplacian terms. If it is the horizontal gradient that also falls below the threshold, then the green pixels that are proximate to the horizontal axis, i.e., $G_3$ and $G_{10}$ for the NW-SE gradient and $G_5$ and $G_8$ for the NE-SW gradient, are included in the interpolation together with one-half of the diagonal and horizontal second-order Laplacian terms. If the vertical or horizontal gradients fall within the threshold, thereby causing the second step to be performed, the values calculated in the first and second steps are averaged such that the weight of the value calculated in the second step is one-half of the weight of the value calculated in the first step. This is preferably done because the green pixels used in the second step are located further away from the central red pixel, $R_5$, than the four green pixels considered in the first step, $G_4$, $G_6$, $G_7$ and $G_9$, which are all adjacent to the central red pixel. If neither the vertical or horizontal gradients fall within the threshold, then the value calculated in the first step is treated as the final, interpolated value.

Regardless of which diagonal gradient falls below the threshold, i.e., NE-SW or NW-SE, the four green pixels that are adjacent to the central red pixel are used in the interpolation. Accordingly, it is desirable to also consider the influence of the horizontal or vertical gradients provided that it too falls below the threshold. However, in considering the influence of the horizontal or vertical gradient as well, the interpolation uses those green pixels that lean toward the selected diagonal gradient, rather than the green color values that lie directly along the horizontal or vertical gradients and are adjacent to the central red pixel, since these green color pixels have already been utilized in the interpolation, as mentioned above.

FIG. 4 is a highly schematic illustration of pseudo-code 400 for computing a missing green value at a red pixel. First of all, engine 120 sets a green sum ("gsum") variable and a count ("cnt") both to zero as indicated at line 402. Next, engine 120 tests whether the two computed diagonal gradients, i.e., NE-SW and NW-SE, are bigger than the threshold as indicated at line 404. If so, engine 120 tests whether the N-S gradient is less than or equal to the threshold, as indicated at line 406. If it is, engine 120 computes a new green sum value as follows.

$$gsum = \text{current } gsum + \frac{G_4 + G_9}{2} + \frac{(R_5 - R_8) - (R_2 - R_5)}{4}, \quad (5)$$

as indicated at line 408. That is, the current gsum value is incremented by the average of the green values along the N-S direction plus an approximation of the second derivative of the red values along the N-S direction, which is itself an approximation of the second derivative of the green pixels and luminance along the N-S direction. The approximation of the second derivative basically corresponds to a high pass filter, thereby emphasizing the high frequency information. Engine 120 then increments the counter value by one, as indicated at line 410.

Engine 120 next determines whether the computed E-W gradient is less than or equal to the threshold, as indicated at line 412. If the computed E-W gradient is not less than or equal to the threshold, engine 120 proceeds directly to computing the missing green value for the red pixel under consideration as follows.

$$\text{missing green value} = \frac{gsum}{cnt}, \quad (6)$$

as indicated at line 414 at the bottom of FIG. 4.

If, however, the E-W gradient is less than or equal to the threshold, then engine 120 computes a new green sum value (rather than proceeding directly to compute the missing green value), as follows:

$$gsum = \text{current } gsum + \frac{G_6 + G_7}{2} + \frac{(R_5 - R_6) - (R_4 - R_5)}{4}, \quad (7)$$

as indicated at line 416, and increments by one the counter value, as indicated at line 418. Here, the current gsum value is incremented by the average of the green values along the E-W direction plus the rate of change of the red values along the E-W direction. After computing the new gsum as indicated in equation (7) above, engine 120 computes the missing green color value, as indicated at line 414 described above.

Returning to line 404, if either or both of the diagonal gradients were not greater than the threshold, engine 120 determines whether the NE-SW gradient is less than or equal to the threshold, as indicated at line 420. If so, engine 120 computes a new green sum value as follows:

$$gsum = \text{current } gsum + \frac{G_4 + G_9}{2} + \frac{(R_5 - R_8) - (R_2 - R_5)}{4} + \frac{G_6 + G_7}{2} + \frac{(R_5 - R_6) - (R_4 - R_5)}{4}, \quad (8)$$

as indicated at line 422, and increments the counter by two, as indicated at line 424. Equation (8), which is basically the sum of equations (5) and (7), is interpolating using the four green pixels that are adjacent to the central red pixel, because they all lie along the diagonal direction. Engine 120 then goes on to set two intermediary variables, a temporary_green_sum (tgsum) variable and a temporary_counter (tcnt) variable, both to zero, as indicated at line 426. As described below, temporary values are used to reduce the weight, e.g., to one-half, given to the contributions of the horizontal and/or vertical gradients, as the pixels used in the horizontal and vertical gradients are further away. In this way, the horizontal and/or vertical gradient components of the interpolation can be summed first and then normalized, if necessary, before adding them to the overall total. Next, engine 120 determines whether the N-S gradient is less than or equal to the threshold, as indicated at line 428. If so, engine 120 computes a new tgsum value as follows:

$$tgsum = tgsum + \frac{G_2 + G_{11}}{2} + \quad (9)$$
$$\frac{(((R_5 - R_7) - (R_3 - R_5) + (R_5 - R_8) - (R_2 - R_5)))}{4},$$

as indicated at line 430. Equation (9) basically adds in those green pixels lying along the vertical gradient that lean toward the NE-SW direction, i.e., $G_2$ and $G_{11}$, and the second order derivative along both the NE-SW diagonal and the vertical directions. Engine 120 also increments the tent variable by one as indicated at line 432.

Next, engine 120 determines whether the E-W gradient is less than or equal to the threshold, as indicated at line 434. If it is, engine 120 computes a new tgsum value as follows.

$$tgsum = tgsum + \frac{G_5 + G_8}{2} + \quad (10)$$
$$\frac{(((R_5 - R_7) - (R_3 - R_5) + (R_5 - R_6) - (R_4 - R_5)))}{4},$$

as indicated at line 436, and increments the tent variable by one, as indicated at line 438. Equation (10) basically adds in those green pixels lying along the horizontal gradient that lean toward the NE-SW direction, i.e., $G_5$ and $G_8$, and the second order derivative along both the NE-SW diagonal and the horizontal directions.

Next, engine 120 determines whether the tent variable is greater than zero, as indicated at line 440. If so, engine 120 computes a new gsum value as follows:

$$gsum = \text{current } gsum + \frac{tgsum}{tcnt},$$

as indicated at line 442, and increments the cnt variable by one, as indicated at line 444.

Next, engine 120 determines whether the NW-SE gradient is less than or equal to the threshold, as indicated at line 446. If so, engine 120 computes a new gsum variable as follows.

$$gsum = \text{current } gsum + \frac{G_4 + G_9}{2} + \quad (11)$$
$$\frac{(R_5 - R_8) - (R_2 - R_5)}{4} + \frac{G_6 + G_7}{2} +$$

$$\frac{(R_5 - R_6) - (R_4 - R_5)}{4},$$

as indicated at line 448, and increments the cnt variable by two, as indicated at line 450. Engine 120 then sets both the tgsum and the tcnt variables to zero, as indicated at line 452. Next, engine 120 determines whether the N-S gradient is less than or equal to the threshold, as indicated at line 454. If so, engine 120 computes a value for the new tgsum variable as follows.

$$tgsum = \text{current } tgsum + \frac{G_1 + G_{12}}{2} + \frac{(((R_5 - R_9) - (R_1 - R_5) + (R_5 - R_8) - (R_2 - R_5)))}{4}, \quad (12)$$

as indicated at line 456, and increments the tcnt variable by one, as indicated at line 458. The engine 120 then determines whether the E-W gradient is less than or equal to the threshold, as indicated at line 460. If it is, engine 120 computes a new value for the tgsum variable as follows.

$$tgsum = \text{current } tgsum + \frac{G_3 + G_{10}}{2} + \frac{(((R_5 - R_9) - (R_1 - R_5) + (R_5 - R_6) - (R_4 - R_5)))}{4}, \quad (13)$$

as indicated at line 462, and increments the tcnt variable by one, as indicated at line 464.

Next, engine 120 determines whether the tcnt variable is greater than zero, as indicated at line 466. If so, engine 120 computes a new gsum value as follows:

$$gsum = gsum + \frac{tgsum}{tcnt},$$

as indicated at line 468, and increments the cnt variable by one, as indicated at line 470.

Using the final values for gsum and cnt, engine 120 then computes the missing green value as indicated at line 414 described above.

Compute Missing Green Values at Blue Pixels

Figure 5:
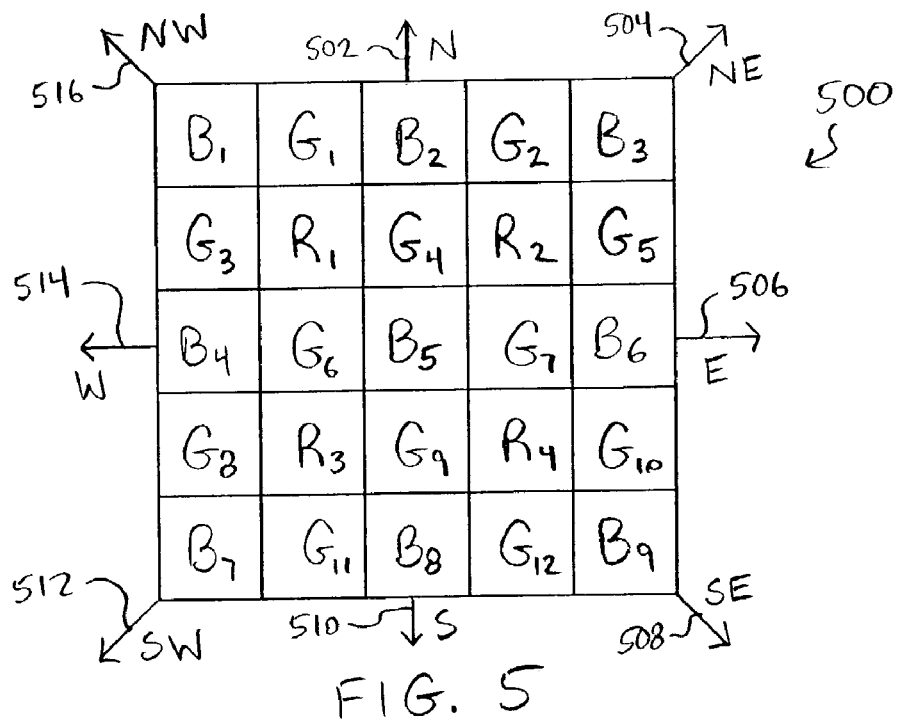

A similar process is performed to compute a missing green value for a blue pixel as represented by block 206 (FIG. 2). In particular, as with the computation centered on the red pixel, engine 120 again computes four gradients relative to the blue pixel for which a missing green value is being computed. Each gradient similarly represents the sum of the absolute value of the color differences along the respective gradient and the absolute value of Laplacian second-order terms. The gradients may be viewed in terms of compass directions relative to the subject pixel. FIG. 5 is a five-by-five array or grid 500 of measured color values centered on a blue pixel, i.e., $B_5$. Grid 500 also has a North (N) direction 502, a North-East (NE) direction 504, an East (E) direction 506, a South-East (SE) direction 508, a South (S) direction 510, a South-West (SW) direction 512, a West (W) direction 514 and a North-West (NW) direction 516.

The gradients are computed along the same four directions relative to the subject blue pixel: N-S, E-W, NE-SW, and NW-SE.

In the case of a blue pixel, the N-S gradient is computed as follows:

$$N\text{-}S = |G_4 - G_9| + |(B_5 - B_8) - (B_2 - B_5)| \quad (14)$$

The E-W gradient is computed as follows:

$$E\text{-}W = |G_6 - G_7| + |(B_5 - B_4) - (B_6 - B_5)| \quad (15)$$

The NE-SW gradient is computed as follows:

$$NE - SW = \left| \frac{(G_2 + G_5) - (G_6 + G_9)}{4} \right| + \left| \frac{(G_4 + G_7) - (G_8 + G_{11})}{4} \right| + \left| ((B_5 - B_7) - (B_3 - B_5)) + \frac{((B_5 - B_8) - (B_2 - B_5))}{2} + \frac{((B_5 - B_4) - (B_6 - B_5))}{2} \right| \quad (16)$$

The NW-SE gradient is computed as follows:

$$NW - SE = \left| \frac{(G_1 + G_3) - (G_7 + G_9)}{4} \right| + \left| \frac{(G_4 + G_6) - (G_{10} + G_{12})}{4} \right| + \left| ((B_5 - B_9) - (B_1 - B_5)) + \frac{((B_5 - B_8) - (B_2 - B_5))}{2} + \frac{((B_5 - B_4) - (B_2 - B_5))}{2} \right| \quad (17)$$

After the four gradients have been computed, engine 120 next determines a threshold for use in evaluating the computed gradients in the same manner as described above. Engine 120 is ready to compute the missing green value for the subject blue pixel, $B_5$. FIG. 6 is a highly schematic illustration of pseudo-code 600 for computing a missing green value at a blue pixel. First, engine 120 sets a green sum ("gsum") variable and a count ("cnt") both to zero, as indicated at line 602. Next, engine 120 tests whether the two computed diagonal gradients, i.e., NE-SW and NW-SE, are bigger than the threshold, as indicated at line 604. If so, engine 120 tests whether the N-S gradient is less than or equal to the threshold, as indicated at line 606. If it is, engine 120 computes a new green sum value as follows.

$$gsum = \text{current } gsum + \frac{G_4 + G_9}{2} + \frac{(B_5 - B_8) - (B_2 - B_5)}{4}, \quad (18)$$

as indicated at line 608, and increments the cnt value by one, as indicated at line 610.

Engine 120 next determines whether the computed E-W gradient is less than or equal to the threshold, as indicated at line 612. If the computed E-W gradient is not less than or equal to the threshold, engine 120 proceeds directly to computing the missing green value for the blue pixel under consideration as follows.

$$\text{missing green value} = \frac{\text{green sum}}{\text{counter}}, \quad (19)$$

as indicated at line 614 at the bottom of FIG. 6.

If, however, the E-W gradient is less than or equal to the threshold, then engine 120 computes a new green sum value (rather than proceeding directly to compute the missing green value), as follows:

$$gsum = \text{current } gsum + \frac{G_6 + G_7}{2} + \frac{(B_5 - B_6) - (B_4 - B_5)}{4}, \quad (20)$$

as indicated at line 616, and increments the cnt value by one, as indicated at line 618.

After computing the green sum as indicated in equation (19) above, engine 120 computes the missing green value as indicated at line 614 described above.

Returning to line 604, if either or both of the diagonal gradients were not greater than the threshold, engine 120 determines whether the NE-SW gradient is less than or equal to the threshold, as indicated at line 620. If so, engine 120 computes a new green sum value as follows:

$$gsum = \text{current } gsum + \frac{G_4 + G_9}{2} + \frac{(B_5 - B_8) - (B_2 - B_5)}{4} + \frac{G_6 + G_7}{2} + \frac{(B_5 - B_6) - (B_4 - B_5)}{4}, \quad (21)$$

as indicated at line 622, and increments the counter by two, as indicated at line 624. Engine 120 then goes on to set two intermediary variables, a temporary_green_sum (tgsum) variable and temporary_counter (tent) variable, both to zero, as indicated at line 626. Next, engine 120 determines whether the N-S gradient is less than or equal to the threshold, as indicated at line 628. If so, engine 120 computes a new tgsum value as follows:

$$tgsum = tgsum + \frac{G_2 + G_{11}}{2} + \frac{(((B_5 - B_7) - (B_3 - B_5) + (B_5 - B_8) - (B_2 - B_5)))}{4}, \quad (22)$$

as indicated at line 630. Engine 120 also increments the tcnt variable by one as indicated at line 632.

Next, engine 120 determines whether the E-W gradient is less than or equal to the threshold, as indicated at line 634. If it is, engine 120 computes a new tgsum value as follows.

$$tgsum = tgsum + \frac{G_5 + G_8}{2} + \frac{(((B_5 + B_7) - (B_3 - B_5) + (B_5 - B_6) - (B_4 - B_5)))}{4}, \quad (23)$$

as indicated at line 636, and increments the tent variable by one, as indicated at line 638.

Next, engine 120 determines whether the tent variable is greater than zero, as indicated at line 640. If so, engine 120 computes a new gsum value as follows:

$$gsum = gsum + \frac{tgsum}{tcnt},$$

as indicated at line 642, and increments the cnt variable by one, as indicated at line 644.

Next, engine 120 determines whether the NW-SE gradient is less than or equal to the threshold, as indicated at line 646. If so, engine 120 computes a new gsum variable as follows.

$$gsum = \text{current } gsum + \frac{G_4 + G_9}{2} + \frac{(B_5 - B_8) - (B_2 - B_5)}{4} + \frac{G_6 + G_7}{2} + \frac{(B_5 - B_6) - (B_4 - B_5)}{4}, \quad (24)$$

as indicated at line 648, and increments the cnt variable by two, as indicated at line 650. Engine 120 then sets both the tgsum and the tent variables to zero, as indicated at line 652. Next, engine 120 determines whether the N-S gradient is less than or equal to the threshold, as indicated at line 654. If so, engine 120 computes a value for the new tgsum variable as follows.

$$tgsum = tgsum + \frac{G_1 + G_{12}}{2} + \frac{(((B_5 - B_9) - (B_1 - B_5) + (B_5 - B_8) - (B_2 - B_5)))}{4}, \quad (25)$$

as indicated at line 656, and increments the tent variable by one, as indicated at line 658. The engine 120 then determines whether the E-W gradient is less than or equal to the threshold, as indicated at line 660. If it is, engine 120 computes a new value for the tgsum variable as follows.

$$tgsum = tgsum + \frac{G_3 + G_{10}}{2} + \frac{(((B_5 - B_9) - (B_1 - B_5) + (B_5 - B_6) - (B_4 - B_5)))}{4}, \quad (26)$$

as indicated at line 662, and increments the tent variable by one, as indicated at line 664.

Next, engine 120 determines whether the tent variable is greater than zero, as indicated at line 666. If so, engine 120 computes a new gsum value as follows:

$$gsum = gsum + \frac{tgsum}{tcnt},$$

as indicated at line 668, and increments the cnt variable by one, as indicated at line 670.

Using the latest values for gsum and cnt, engine 120 then computes the missing green value for the subject blue pixel, as indicated at line 614 described.

It should be understood that the method illustrated with FIG. 6 is the same as the one illustrated by FIG. 4 except that for each occurrence of a red color value (as in FIG. 4), engine 120 substitutes the corresponding blue color value.

Interpolation of Missing Red Values for Green Pixels

Now that engine 120 has computed the missing green color values for the captured image, it next proceeds to compute the missing red values at the green pixels as represented by block 208 (FIG. 2).

Figure 7:
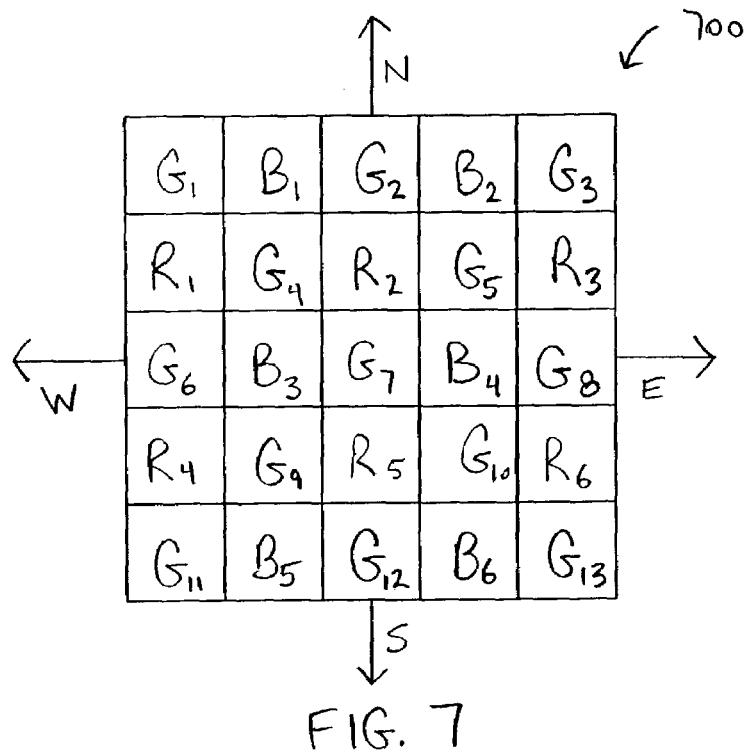
Figure 8:
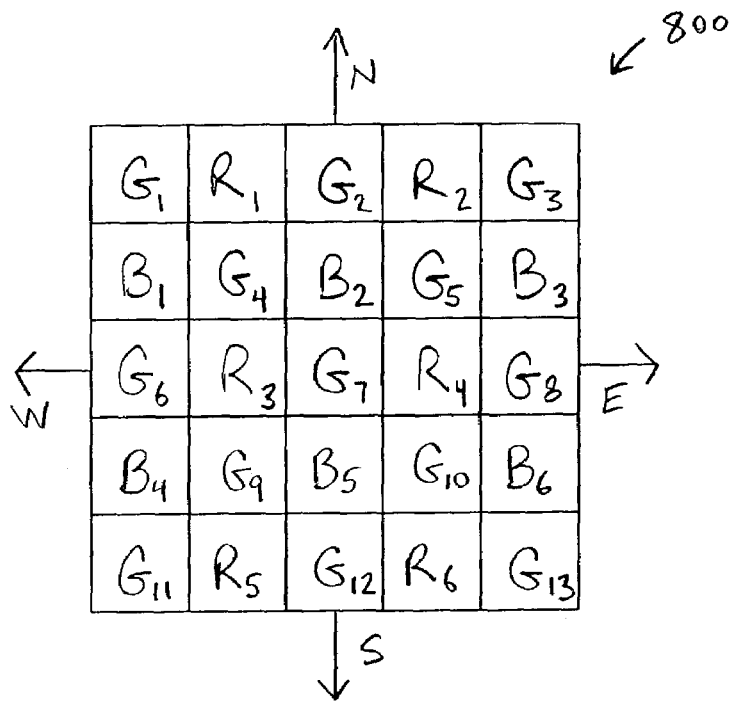

FIGS. 7 and 8 are five-by-five arrays or grids 700 and 800, respectively, of measured color values showing the two different patterns that are possible when the center of the grid is a green pixel. In the case of grid 700 of FIG. 7, the central, green pixel, $G_7$, is sandwiched along the horizontal or E-W axis between two blue pixels, $B_3$ and $B_4$. In the grid 800 of FIG. 8, the central, green pixel, $G_7$, is sandwiched horizontally between two red pixels, $R_3$ and $R_4$. The computations for generating the missing red value for these two patterns is slightly different.

To compute a red value for a green pixel, given the pattern of grid 700 (FIG. 7), in which the central green pixel is sandwiched horizontally between two blue pixels, the interpolation engine 120 first computes the four gradients, N-S, E-W, NE-SW, and NW-SE relative to the green pixel for which a missing red value is being computed.

The N-S gradient is computed by taking the difference between the red pixel values in the N-S direction and adding to this difference a second-order corrective term that increases the gradient if the rate of change of the gradient is increasing. A suitable equation is as follows:

$$N\text{-}S = |R_2 - R_5| + |(G_7 - G_{R2}) - (G_{R5} - G_7)| \tag{27}$$

Here, $G_{R2}$ represents the green computed value for the pixel at location $R_2$, $G_{R5}$ represents the green computed value for the pixel at location $R_5$, and so on. Because no red values lie directly along the E-W direction, to compute the E-W gradient, the first term consists of the difference between averaged red values that lie roughly in the E-W direction, while the second-order term increases the gradient if the rate of change of the gradient is increasing. A suitable equation for computing the E-W gradient is as follows:

$$E - W = \frac{(|R_1 - R_2| + |R_2 - R_3| + |R_4 - R_5| + |R_5 - R_6|)}{4} +$$

$$|((G_7 - G_{R1}) - (G_{R3} - G_7)) + ((G_7 - G_{R4}) - (G_{R6} - G_7))| \tag{28}$$

The NE-SW gradient is computed by taking the difference of averaged red values as there are no red values that lie directly along the NE-SW gradient and adding a second-order corrective term that is calculated with respect to the center pixel. A suitable equation is as follows:

$$NE - SW = \frac{(|R_1 - R_5| + |R_2 - R_4|)}{2} +$$

$$|((G_7 - G_{R3}) - (G_{R5} - G_7)) + ((G_7 - G_{R2}) - (G_{R4} - G_7))| \tag{29}$$

The NW-SE gradient is similarly computed by taking the difference of averaged red values and adding a second-order corrective term that is again calculated with respect to the center pixel. A suitable equation for computing the NW-SE gradient is as follows:

$$NW - SE = \frac{(|R_1 - R_5| + |R_2 - R_6|)}{2} +$$

$$|((G_7 - G_{R1}) - (G_{R5} - G_7)) + ((G_7 - G_{R2}) - (G_{R6} - G_7))| \tag{30}$$

After the four gradients have been computed, engine 120 next determines a threshold for use in evaluating the computed gradients, in the same manner as described above.

Having computed the four gradients and the threshold, engine 120 is now ready to compute the missing red value at the subject green pixel. FIG. 9 is a highly schematic illustration of pseudo-code 900 for use in generating the red value at the central green pixel, $G_5$, of the array 700 illustrated in FIG. 7.

First, two variables, red_sum (rsum) and count (cnt), are set to zero as indicated at line 902. Next, engine 120 determines whether the computed N-S gradient is less than or equal to the threshold, as indicated at line 904. If so, engine 120 then determines whether the E-W gradient is less than the N-S gradient, as indicated at line 906. If the E-W gradient is less, then engine 120 computes a new rsum value as follows.

rsum=current rsum+$(R_1+R_4+R_3+R_6)$+

$$\frac{((G_7 - G_{R3}) - (G_{R1} - G_7))}{2} + \frac{((G_7 - G_{R6}) - (G_{R4} - G_7))}{2} \tag{31}$$

as indicated at line 908, and increments the value of the cnt variable by four, as indicated at line 910. Basically, equation (31) averages the red pixels along the horizontal direction and adds a second order term that emphasizes higher frequency information.

Engine 120 then determines whether the NE-SW gradient is less than or equal to the threshold, as indicated at line 912. If not, engine 120 determines whether the NW-SE gradient is less than or equal to the threshold, as indicated at line 914. If not, engine 120 computes the missing red color value utilizing just the information in the horizontal or E-W direction as follows.

$$\text{missing red value} = \frac{rsum}{cnt}$$

as indicated at line 916 using the current rsum and cnt values.

If the E-W gradient was not less than the N-S gradient as determined at line 906, engine 120 determines whether the N-S gradient is less than the E-W gradient as indicated at line 918. If so, engine 120 computes a new rsum as follows.

rsum=current rsum+$(R_2+R_5)*2+((G_7-G_{R2})-(G_{R5}-G_7))$ (32)

as indicated at line 920, and increments the cnt variable by four, as indicated at line 922. In other words, the red pixels along the vertical direction are averaged and a second order term is added that has the effect of emphasizing the higher frequency information. Engine 120 then evaluates the NE-SW and the NW-SE gradients as indicated at lines 912 and 914 described above. If both diagonal gradients are above the thresholds then the missing red color value is computed utilizing just the information in the vertical or N-S direction.

If the N-S and E-W gradients are equal, engine 120, as indicated at line 924, first computes a new rsum in the same manner as described above for line 908. Engine 120 then computes another new rsum value, as indicated at line 926, using equation (32) described at line 920. Engine 120 then increments the cnt variable by eight, as indicated at line 928. Engine 120 then evaluates the NE-SW and the NW-SE gradients as indicated at lines 912 and 914 described above. If both diagonal gradients are above the threshold, then the missing red color value is computed utilizing the information in both the vertical and horizontal directions.

If the N-S gradient was not less than or equal to the threshold as determined at line 904, then engine 120 determines whether the E-W gradient is less than or equal to the threshold, as indicated at line 930. If it is, engine 120 computes a new rsum value, as indcted at line 932 in the same manner as described in connection with equation (31) as described above at line 908, and similarly increments the cnt variable by four, as indicated at line 934. Engine 120 then evaluates the NE-SW and the NW-SE gradients as indicated at lines 912 and 914 described above. If both diagonal gradients are above the threshold, then the missing red color value is computed utilizing just the information in the horizontal direction.

If the NE-SW gradient as tested at line 912 is less than or equal to the threshold, engine 120 determines whether the NW-SE gradient is less than the NE-SW gradient, as indicated at line 936. If it is, engine 120 computes a new rsum value by averaging the red pixel values along the NW-SE direction and adding a second order term that emphasizes higher frequency information. A suitable equation is as follows.

$$\text{rsum} = \text{current rsum} + (R_1 + R_2 + R_6 + R_5) + ((G_7 - G_{R1}) - (G_{R6}G_7)) + (G_7 - G_{R2}) - (G_{R5} - G_7)) \quad (33)$$

as indicated at line 938, and increments the cnt variable by four, as indicated at line 940. If the NW-SE gradient was not less than the NE-SW gradient, engine 120 determines whether the NE-SW gradient is less than the NW-SE gradient, as indicated at line 942. If so, a new rsum value is computed by averaging the red pixel values along the NE-SW direction and adding a second order term that emphasizes higher frequency information. A suitable equation is as follows.

$$\text{rsum} = \text{current rsum} + (R_3 + R_2 + R_4 + R_5) + ((G_7 - G_{R3}) - (G_{R4}G_7)) + ((G_7 - G_{R2}) - (G_{R5} - G_7)) \quad (34)$$

as indicated at line 944, and increments the cnt variable by four as indicated at line 946. If the NE-SW and NW-SE gradients are equal, engine 120 computes a first new rsum value, as indicated at line 948, in the same manner as described in connection with equation (33) described above at line 938. Using this first new rsum value, engine 120 then goes on to compute a second rsum value, as indicated at line 950, in the same manner as described in connection with equation (34) described above at line 944. Engine 120 then increments the cnt variable by eight, as indicated at line 952.

If the NW-SE gradient as tested at line 914 is less than or equal to the threshold, engine 120 computes a new rsum value, as indicated at line 954, in the same manner as described in connection with line 938, and increments the cnt variable by four, as indicated at line 956.

Using the latest values for rsum and cnt, engine 120 computes the missing red color value as indicated at line 916, as described above.

FIG. 10 is a highly schematic illustration of pseudo-code 1000 illustrating a preferred method for calculating the missing red color value for the central green pixel, $G_7$, of grid 800 (FIG. 8), which is sandwiched horizontally between two red pixels, $R_3$ and $R_4$.

The N-S gradient is preferably computed as follows.

$$N - S = \frac{(|R_1 - R_3| + |R_3 - R_5| + |R_2 - R_4| + |R_4 - R_6|)}{4} + \quad (35)$$
$$|((G_7 - G_{R1}) - (G_{R5} - G_7)) + (G_7 - G_{R2}) - (G_{R6} - G_7))|$$

The E-W gradient is preferably computed as follows.

$$E\text{-}W = |R_3 - R_4| + |(G_7 - G_{R5}) - (G_{R2} - G_7)| \quad (36)$$

The NE-SW gradient is preferably computed as follows.

$$NE - SW = \frac{|(R_2 - R_3) + (R_4 - R_5)|}{2} + \quad (37)$$
$$|((G_7 - G_{R2}) - (G_{R3} - G_7)) + (G_7 - G_{R4}) - (G_{R5} - G_7))|$$

The NW-SE gradient is preferably computed as follows.

$$NE - SE = \frac{|(R_2 - R_4) + (R_3 - R_6)|}{2} + \quad (38)$$
$$|((G_7 - G_{R1}) - (G_{R4} - G_7)) + (G_7 - G_{R3}) - (G_{R6} - G_7))|$$

Utilizing the computed gradients, engine 120 then computes a threshold in the same manner as described above. Engine 120 is now ready to compute the missing red color value. First, two variables, red_sum (rsum) and count (cnt), are set to zero as indicated at line 1002. Next, engine 120 determines whether the computed N-S gradient is less than or equal to the threshold, as indicated at line 1004. If so, engine 120 then determines whether the E-W gradient is less than the N-S gradient, as indicated at line 1006. If the E-W gradient is less, then engine 120 computes a new rsum value as follows.

$$\text{rsum} = \text{current } \text{rsum} + (R_1 + R_2 + R_5 + R_6) + \quad (39)$$
$$\frac{((G_7 - G_{R5}) - (G_{R1} - G_7))}{2} + \frac{((G_7 - G_{R6}) - (G_{R2} - G_7))}{2}$$

as indicated at line 1008, and increments the value of the cnt variable by four, as indicated at line 1010.

Engine 120 then determines whether the NE-SW gradient is less than or equal to the threshold, as indicated at line 1012. If not, engine 120 determines whether the NW-SE gradient is less than or equal to the threshold, as indicated at line 1014. If not, engine 120 computes the missing red color value utilizing just the information in the horizontal or E-W direction as follows.

$$\text{missing red value} = \frac{rsum}{cnt}$$

as indicated at line 1016 using the current rsum and cnt values.

If the E-W gradient was not less than the N-S gradient as determined at line 1006, engine 120 determines whether the N-S gradient is less than the E-W gradient as indicated at line 1018. If so, engine 120 computes a new rsum as follows.

$$\text{rsum} = \text{current rsum} + (R_3 + R_4)*2 + ((G_7 - G_{R3}) - (G_{R4} - G_7)) \quad (40)$$

as indicated at line 1020, and increments the cnt variable by four, as indicated at line 1022. Engine 120 then evaluates the NE-SW and the SE-NW gradients as indicated at lines 1012 and 1014 described above. If both diagonal gradients are above the threshold, then the missing red color value is computed utilizing just the information in the vertical or N-S direction.

If the N-S and E-W gradients are equal, engine 120, as indicated at line 1024, first computes a new rsum in the same manner as described above for line 1008. Engine 120 then computes another new rsum value, as indicated at line 1026, using equation (40) described at line 1020. Engine 120 then increments the cnt variable by eight, as indicated at line 1028. Engine 120 then evaluates the NE-SW and the SE-NW gradients as indicated at lines 1012 and 1014 described above. If both diagonal gradients are above the threshold, then the missing red color value is computed utilizing the information in both the vertical and horizontal directions.

If the N-S gradient was not less than or equal to the threshold as determined at is line 1004, then engine 120 determines whether the E-W gradient is less than or equal to the threshold, as indicated at line 1030. If it is, engine 120 computes a new rsum value, as indicted at line 1032 in the same manner as described in connection with equation (39) as described above at line 1008, and similarly increments the cnt variable by four, as indicated at line 1034. Engine 120 then evaluates the NE-SW and the SE-NW gradients as indicated at lines 1012 and 1014 described above. If both diagonal gradients are above the threshold, then the missing red color value is computed utilizing just the information in the horizontal or E-W direction.

If the NE-SW gradient as tested at line 1012 is less than or equal to the threshold, engine 120 determines whether the NW-SE gradient is less than the NE-SW gradient, as indicated at line 1036. If it is, engine 120 computes a new rsum value as follows.

$$\text{rsum} = \text{current rsum} + (R_2 + R_4 + R_3 + R_5) + ((G_7 - G_{R2}) - (G_{R3} G_7)) + ((G_7 - G_{R4}) - (G_{R5} - G_7)) \quad (41)$$

as indicated at line 1038, and increments the cnt variable by four, as indicated at line 1040. If the NW-SE gradient was not less than the NE-SW gradient, engine 120 determines whether the NE-SW gradient is less than the NW-SE gradient, as indicated at line 1042. If so, a new rsum value is computed as follows.

$$\text{rsum} = \text{current rsum} + (R_1 + R_3 + R_4 + R_6) + ((G_7 - G_{R1}) - (G_{R4} G_7)) + ((G_7 - G_{R3}) - (G_{R6} - G_7)) \quad (42)$$

as indicated at line 1044, and increments the cnt variable by four as indicated at line 1046. If the NE-SW and NW-SE gradients are equal, engine 120 computes a first new rsum value, as indicated at line 1048, in the same manner as described in connection with equation (41) described above at line 1038. Using this first new rsum value, engine 120 then goes on to compute a second rsum value, as indicated at line 1050, in the same manner as described in connection with equation (42) described above at line 1044. Engine 120 then increments the cnt variable by eight, as indicated at line 1052.

If the NW-SE gradient as tested at line 914 is less than or equal to the threshold, engine 120 computes a new rsum value, as indicated at line 1054, in the same manner as described in connection with line 1038, and increments the cnt variable by four, as indicated at line 1056.

Using the latest values for rsum and cnt, engine 120 then computes the missing red color value, as indicated at line 1016.

Interpolation of Missing Red Values for Blue Pixels

As represented by block 210, engine 120 next proceeds to compute the missing red color values for the blue pixels. The engine 120 first computes the four gradients preferably as follows.

$$N - S = \frac{(|R_1 - R_3| + |R_2 - R_4|)}{2} + \\ ((G_{B5} - G_{R1}) - (G_{R3} - G_{B5})) + ((G_{B5} - G_{R2}) - (G_{R4} - G_{B5}))| \quad (43)$$

$$E - W = \frac{(|R_1 - R_2| + |R_3 - R_4|)}{2} + \\ ((G_{B5} - G_{R1}) - (G_{R2} - G_{B5})) + ((G_{B5} - G_{R3}) - (G_{R4} - G_{B5}))| \quad (44)$$

$$NE\text{-}SW = |R_2 - R_3| + |(G_{B5} - G_{R3}) - (G_{R2} - G_{B5})| \quad (45)$$

$$NW\text{-}SE = |R_1 - R_4| + |(G_{B5} - G_{R1}) - (G_{R4} - G_{B5})| \quad (46)$$

Engine 120 then computes the threshold preferably in the same manner as described above. Armed with the gradients and the threshold, engine 120 proceeds to compute the missing blue color value.

FIG. 11 is a highly schematic illustration of pseudo-code 1100 illustrating the preferred method for computing a missing red value for a blue pixel, such as blue pixel $B_5$, located at the center of array or grid 500 (FIG. 5). First, engine 120 sets both a red sum (rsum) variable and a count (cnt) variable to zero, as indicated at line 1102. Engine 120 then determines whether either or both of the N-S and E-W gradients are less than or equal to the threshold as indicated at line 1104. If so, engine 120 computes a new rsum value taking account all four known red color values as they all lie in the horizontal and vertical directions. A suitable equation is as follows.

$$\text{rsum} = \text{current } \text{rsum} + (R_1 + R_2 + R_3 + R_4) + \\ \frac{((G_{B5} - G_{R3}) - (G_{R2} - G_{B5}))}{2} + \\ \frac{((G_{B5} - G_{R1}) - (G_{R4} - G_{B5}))}{2} \quad (47)$$

as indicated at line 1106, and increments the cnt variable by four, as indicated at line 1108. Engine then proceeds to compute the missing red color value as follows.

$$\text{missing red value} = \frac{rsum}{cnt}$$

as indicated at line 1110, located at the bottom of FIG. 11.

If neither the N-S nor the E-W gradient are below the threshold, engine 120 determines whether the NE-SW gradient is less than or equal to the threshold, as indicated at line 1112. If it is, engine 120 computes a new rsum value by averaging the two red pixels that lie in the NE-SW direction and adding a second order term to emphasize higher frequency information. A suitable equation is as follows.

$$\text{rsum} = \text{current rsum} + (R_2 + R_3) + ((G_{B5} - G_{R3}) - (G_{R2} - G_{B5})) \quad (48)$$

as indicated at line 1114, and increments the cnt variable by two as indicated at line 1116. Here, $G_{B5}$ represents the computed green value at pixel location $B_5$. Using the rsum and cnt values, engine 120 then proceeds to compute the missing red color value as indicated at line 1110 described above.

If the NE-SW gradient is not less than or equal to the threshold, engine 120 checks to see whether the NW-SE gradient is less than or equal to the threshold, as indicated at line 1118. If it is, engine 120 computes a new rsum value by averaging the two red pixels that lie in the NW-SE direction and adding a second order term to emphasize higher frequency information. A suitable equation is as follows.

$$\text{rsum} = \text{current rsum} + (R_1 + R_4) + ((G_{B5} - G_{R1}) - (G_{R4} - G_{B5})) \quad (49)$$

as indicated at line 1120, and increments the cnt value by two as indicated at line 1122. Using these newly computed rsum and cnt values, engine 120 then computes the is missing red color value as indicated at line 1110 described above.

Interpolation of Missing Blue Values for Green Pixels

At this point, engine 120 proceeds to compute the missing blue color values for the green pixels as represented by block 212. Again, two different patterns are possible when the green pixel is located at the center of the five-by-five array or grid as shown in FIGS. 7 and 8.

Considering the array 700 of FIG. 7 in which the central green pixel is sandwiched horizontally between two blue pixels, the four gradients are preferably computed using the equations described above for computing a missing red color value at a green pixel sandwiched between two red pixels and substituting, for each red color value, the corresponding blue color value, and for each green value computed for a red pixel, the green value computed for the corresponding blue pixel. Following these guidelines, the equation for computing the N-S gradient, for example, becomes as follows.

$$N - S = \frac{(|B_1 - B_3| + |B_3 - B_5| + |B_2 - B_4| + |B_4 - B_6|)}{4} + |((G_7 - G_{B1}) - (G_{B5} - G_7)) + (G_7 - G_{B2}) - (G_{B6} - G_7))|$$

As shown, this is basically the same equation for the N-S gradient when computing a missing red color value at a green pixel sandwiched between two red pixels, but with the red color values, e.g., $R_1$ and $R_3$, substituted for their corresponding blue color values, e.g., $B_1$ and $B_3$, and with the green color values computed for red pixel locations, e.g., $G_{R1}$ and $G_{R5}$, substituted for green values computed for corresponding blue pixel locations, e.g., $G_{B1}$ and $G_{B5}$. Using this same substitution method, the remaining gradients are computed. The threshold is also computed in the same manner as previously described.

To compute the missing blue value, engine 120 follows the same procedure described above in connection with FIG. 10 for computing a red color value for a green pixel that is sandwiched between two red pixels. Again, however, each red color value is substituted with the corresponding blue color value and each green color value computed for a red pixel location is substituted with the green color value computed for the corresponding blue pixel location. Accordingly, engine 120 again sets two variables, blue_sum (bsum) and count (cnt), to zero. Next, engine 120 determines whether the computed N-S gradient is less than or equal to the threshold. If so, engine 120 then determines whether the E-W gradient is less than the N-S gradient. If the E-W gradient is less, then engine 120 computes a new bsum value as follows.

$$\text{bsum} = \text{current } \text{bsum} + (B_1 + B_2 + B_5 + B_6) + \frac{((G_7 - G_{B5}) - (G_{B1} - G_7))}{2} + \frac{((G_7 - G_{B6}) - (G_{B2} - G_7))}{2}$$

This is basically the same equation as used when computing a missing red color value at a green pixel sandwiched between two red pixels, as described above, but with the red color values, e.g., $R_1$ and $R_2$ substituted for their corresponding blue color values, e.g., $B_1$ and $B_2$, and with the green color values computed for red pixel locations, e.g., $G_{R5}$ and $G_{R1}$, substituted for green values computed for corresponding blue pixel locations, e.g., $G_{B5}$ and $G_{B1}$.

Engine 120 continues with the same procedure as described above in connection with FIG. 10 but with the previously described substitutions, until a blue color value is computed for the subject green pixel location.

To compute missing blue color values for the array 800 of FIG. 8 in which the central green pixel, G5, is sandwiched between two red pixels, engine 120 preferably utilizes the same procedure as described above in connection with FIG. 9 in which the missing red color value is computed for a green pixel sandwiched between two blue pixels. Again, however, each measured red color value in the equations is substituted with the corresponding measured blue color value, and each computed green color value for a red pixel is substituted with the computed green color value for the corresponding blue pixel.

Interpolation of Missing Blue Values for Red Pixels The only remaining color values that are missing are the blue values for red pixels, which are now computed as represented by block 214 (FIG. 2).

To compute the missing blue color value at a red pixel, engine 120 utilizes the gradients previously computed in connection with the computation of the missing green value at the subject red pixel as described above. Engine 120 also uses the threshold that was computed as part of the process for determining the missing green color value. Armed with the gradients and the threshold, engine 120 proceeds to compute the missing blue color value.

The procedure for computing a missing blue color value at a red pixel is basically the same procedure as used to compute the missing red color values for a blue pixel, as previously described in connection with the pseudo-code illustrated at FIG. 11. However, each measured red color value in the equations is substituted with the corresponding measured blue color value, each computed green color value for a red pixel is substituted with the computed green color value for the corresponding blue pixel, and each computed green value for a blue pixel is substituted for with the computed green color value for the corresponding red pixel.

That is, engine 120 first sets both a blue_sum (bsum) variable and a count (cnt) variable to zero. Engine 120 then compares the gradients to the threshold. If either the N-S gradient or the E-W gradient is less than the threshold, then engine 120 computes a new bsum value as follows.

$$bsum = \text{current } bsum + (B_1 + B_2 + B_3 + B_4) +$$
$$\frac{((G_{R5} - G_{B3}) - (G_{B2} - G_{R5}))}{2} + \frac{((G_{R5} - G_{B1}) - (G_{B4} - G_{R5}))}{2}$$

This is basically the same as equation (43) described above in connection with line 1106 of FIG. 11, except that each measured red color value, e.g., $R_1$ and $R_2$, has been substituted with the corresponding measured blue color value, e.g., $B_1$ and $B_2$, each computed green color value for a red pixel, e.g., $G_{R3}$ and $G_{R2}$, has been substituted with the computed green color value for the corresponding blue pixel, e.g., $G_{B3}$ and $G_{B2}$, and each computed green value for a blue pixel, e.g., $G_{B5}$, has been substituted for with the computed green color value for the corresponding red pixel, e.g., $G_{R5}$.

Engine 120 continues with the same procedure as described above in connection with FIG. 11 but with the previously described substitutions, until a blue color value is computed for the subject red pixel location.

At this point, engine 120 has computed the two missing color values for each pixel location of the input image that is at least two pixels away from any edge of the input image.

Interpolation of Missing Values at Image Boundaries

Assuming the sensor 106 has a generally rectangular shape, it will be appreciated that the foregoing interpolation procedure cannot be performed along the edges of the rectangle defined by the sensor 106 as there is insufficient pixel information at these locations to run the algorithms. If the output image is generated by cropping the data produced by the sensor 106 along all four of its edges or boundaries, then there may be no need to perform any additional processing. In this case, the border regions for which missing color values could not be computed are simply removed from the output image.

If, on the other hand, the output image extends near or to one or more of the sensor's edges, then the algorithm will need to extrapolate image data beyond the edge(s) to provide the data needed for interpolation. For example, consider the five-by-five region of support or grid detailed in the preferred embodiment centered on a first pixel position on the left side of an image midway between the top and bottom of the image. The left two columns of the five-by-five region of support will not have sufficient image data available to utilize the preferred method of interpolation. One solution would be to set the missing data elements to zero. In this case, the preferred method of the present invention will interpret the extrapolated region as a hard black edge and, if the image is not itself black at that point, a less than ideal interpolation will likely occur.

Rather than setting the "missing" data elements to zero, a preferred solution is to replicate the edge pixels from the original image data. Assuming that the color filter array is the Bayer pattern, then the two rows next to the top and bottom of the image will need to be replicated, and the two columns next to the left and right of the image need to be replicated.

Figure 12:
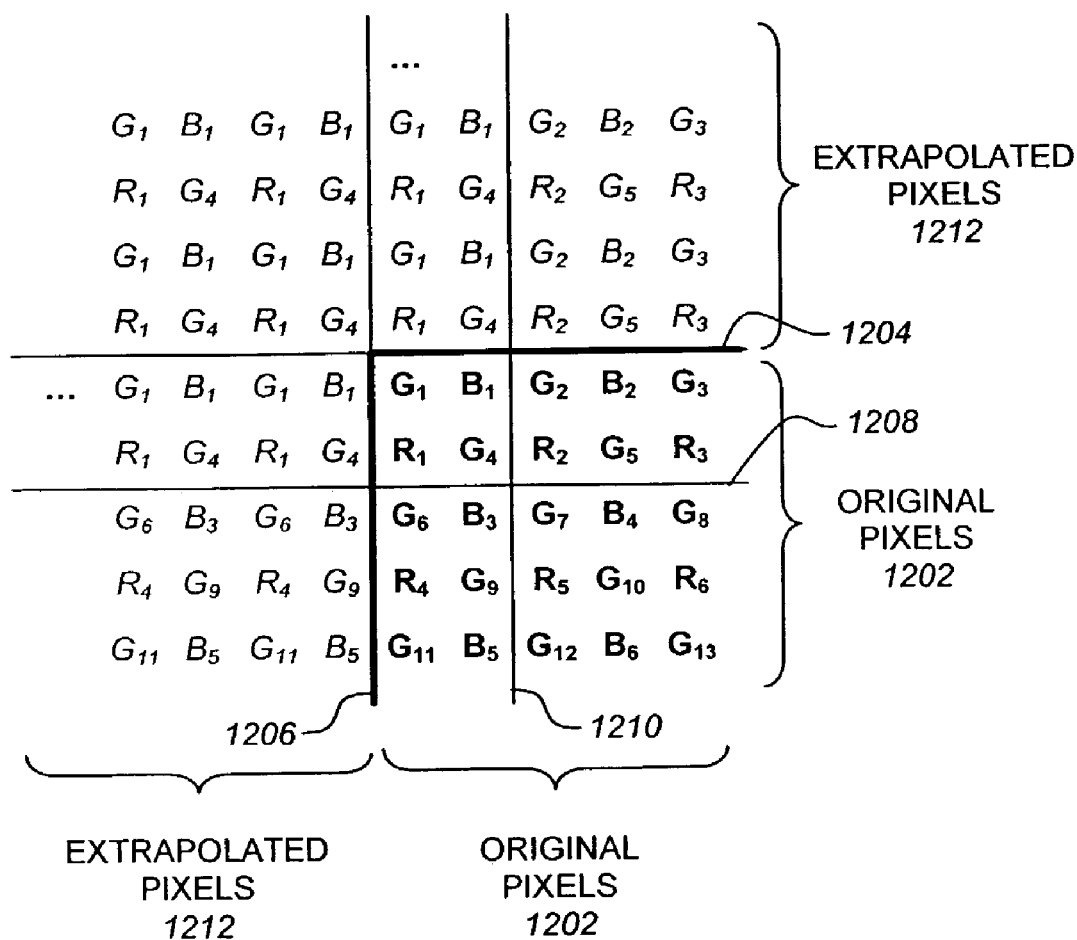
FIG. 12 is a highly schematic illustration of an edge of an image data array.

FIG. 12 is a highly schematic illustration of the top left corner of a captured image. The captured image includes original pixels 1202, and is bounded by a top edge 1204 and a left side edge 1206. For original pixels lying above line 1208 or to the left of line 1210, extrapolated pixels 1212 will need to be replicated in order to execute the preferred method of the present invention. It should be understood that, assuming a five-by-five grid is utilized, only two rows and two columns of extrapolated pixels need to be generated. Nonetheless, four rows and four columns are illustrated in FIG. 12 to better illustrate the process. The extrapolated pixels 1212 basically form a "frame" around the original pixels 1202.

The process of generating values for the extrapolated pixels 1212 is preferably as follows. First, the two left-most columns of original pixels are repeated to the left of the left edge 1206. Although the two left-most columns only need to be repeated once for the case of a five-by-five region of support, they have been repeated twice in FIG. 12 to better illustrate the process for extrapolation for larger regions of support. Similarly, the top two rows of the original pixels 1202 are repeated above the top edge 1204. This leaves only the upper left corner of the "frame" to be filled in with values. To generate these values, the extrapolated values on the left and right are repeated to fill in the upper left corner of the frame.

As shown, the foregoing procedure preserves the Bayer pattern into the "frame" around the original pixels 1202.

Now that the extrapolated pixels have been assigned values, missing color values can be generated for the original pixels 1202 located along the top and left edges 1204, 1206. It should be understood that similar procedures are preferably used to assign color values to the remaining portions of the "frame".

It should be understood that the array utilized to compute the missing color values may be other than five-by-five. For example, larger arrays, such as seven-by-seven could be used, thereby providing additional values for which to compute the gradients and the intermediary sum values, and thus the resulting missing color values. Increasing the size of the array, however, increases the computational complexity of the and thus may require greater processing and memory resources and/or may take longer to generate the final image.

It may be possible to utilize the approach of the present invention with a smaller array size, e.g., three-by-three, but such small arrays may result in artifacts being created in the final image.

The foregoing description has been directed to specific embodiments of the present invention. It will be apparent, however, that other variations and modifications may be made to the described embodiments, with the attainment of some or all of their advantages. For example, other patterns besides the Bayer pattern may be employed. Therefore, it is the object of the appended claims to cover all such variations and modifications as come within the true spirit and scope of the invention.

What is claimed is:

1. A method for interpolating a full color image from an array of data elements wherein each data element corresponds to one measured color value, the method comprising the steps of:
    computing four gradients for a given data element, each gradient extending through the given data element in a different direction within a nominal plane of the array;
    comparing one or more of the computed gradients to a threshold;
    selecting at least one gradient in response to the comparing step; and
    interpolating at least one missing color value for the given data element utilizing at least some of the data elements along the selected gradient, wherein
    computation of each gradient includes adding a first order color value differential along the direction of the respective gradient to a second order color value differential along the direction of the respective gradient.

2. The method of claim 1 wherein the threshold is equal to or greater than at least one of the computed thresholds.

3. The method of claim 2 wherein the threshold is set to the maximum of one of a first variable times the gradient having the lowest value and a second variable.

4. The method of claim 3 wherein the at least one selected gradient is less than or equal to the gradient.

5. The method of claim 1 wherein the gradients computed for a given data element are determined from a fixed-size array of data elements that is centered at the given data element.

6. The method of claim 5 wherein the fixed-size array is five by five data elements.

7. The method of claim 1 wherein the measured color elements are red, green and blue.

8. The method of claim 7 wherein the array corresponds to a Bayer pattern.

9. The method of claim 8 wherein missing green color values are computed for data elements corresponding to measured red and blue color values before missing red and blue color values are computed.

10. The method of claim 1 wherein the array of data elements has one or more edges and the method further comprises the steps of:
   generating extrapolated image data beyond the one or more edges; and
   utilizing the extrapolated image data in the computing and interpolating steps.

* * * * *

UNITED STATES PATENT AND TRADEMARK OFFICE
CERTIFICATE OF CORRECTION

PATENT NO.       : 7,130,491 B2
APPLICATION NO.  : 10/389517
DATED            : October 31, 2006
INVENTOR(S)      : Christopher J. Cheng et al.

It is certified that error appears in the above-identified patent and that said Letters Patent is hereby corrected as shown below:

In column 2, line 60, after "such as" insert -- a --.

In column 2, line 66, delete "ore" and insert -- more --, therefor.

In column 4, line 55, equation "(2)", delete "$|G_6\text{-}G_{71}|$" and insert -- $|G_6\text{-}G_7|$ --, therefor.

In column 9, line 36, delete "tent" and insert -- tcnt --, therefor.

In column 11, line 40, delete "(tent)" and insert -- (tcnt) --, therefor.

In column 12, line 25, delete "tent" and insert -- tcnt --, therefor.

In column 12, line 38, delete "tent" and insert -- tcnt --, therefor.

In column 12, line 51, delete "tent" and insert -- tcnt --, therefor.

In column 12, line 53, delete "tent" and insert -- tcnt --, therefor.

In column 15, equation "(33)", line 2, delete "$(G_{R6}G_7))$" insert -- $(G_{R6}\text{-}G7))$ --, therefor.

In column 15, equation "(34)", line 2, delete "$(G_{R4}G_7))$" and insert -- $(G_{R4}\text{-}G7))$ --, therefor.

In column 17, line 27, after "determined at" delete "is".

In column 17, equation "(41)", line 2, delete "$(G_{R3}G_7))$" and insert -- $(G_{R3}\text{-}G7))$ --, therefor.

In column 17, equation "(42)", line 2, delete "$(G_{R4}G_7))$" and insert -- $(G_{R4}\text{-}G7))$ --, therefor.

UNITED STATES PATENT AND TRADEMARK OFFICE
CERTIFICATE OF CORRECTION

| | |
|---|---|
| PATENT NO. | : 7,130,491 B2 |
| APPLICATION NO. | : 10/389517 |
| DATED | : October 31, 2006 |
| INVENTOR(S) | : Christopher J. Cheng et al. |

It is certified that error appears in the above-identified patent and that said Letters Patent is hereby corrected as shown below:

In column 19, line 25, after "the" delete "is".

Signed and Sealed this

Fifteenth Day of December, 2009

David J. Kappos
*Director of the United States Patent and Trademark Office*